US012529255B2

(12) United States Patent
Irrera et al.

(10) Patent No.: US 12,529,255 B2
(45) Date of Patent: Jan. 20, 2026

(54) FURNITURE ITEM EQUIPPED WITH A COMPARTMENT THAT CAN BE CLOSED BY LEAVES

(71) Applicant: BORTOLUZZI SISTEMI S.P.A., Belluno (IT)

(72) Inventors: Angelo Irrera, Belluno (IT); Adriano Girotto, Belluno (IT); Rodolfo Dal Castel, Belluno (IT)

(73) Assignee: BORTOLUZZI SISTEMI S.P.A., Belluno (IT)

( * ) Notice: Subject to any disclaimer, the term of this patent is extended or adjusted under 35 U.S.C. 154(b) by 323 days.

(21) Appl. No.: 18/018,567

(22) PCT Filed: Aug. 1, 2021

(86) PCT No.: PCT/IB2021/057023
§ 371 (c)(1),
(2) Date: Jan. 29, 2023

(87) PCT Pub. No.: WO2022/029588
PCT Pub. Date: Feb. 10, 2022

(65) Prior Publication Data

US 2023/0295970 A1 Sep. 21, 2023

(30) Foreign Application Priority Data

Aug. 3, 2020 (IT) ........................ 102020000018937

(51) Int. Cl.
*E05D 15/26* (2006.01)
*E05D 15/58* (2006.01)

(52) U.S. Cl.
CPC ........... *E05D 15/264* (2013.01); *E05D 15/58* (2013.01); *E05Y 2201/62* (2013.01); *E05Y 2900/212* (2013.01)

(58) Field of Classification Search
CPC ... E05D 15/264; E05D 15/58; E05Y 2201/62; E05Y 2900/212
See application file for complete search history.

(56) References Cited

U.S. PATENT DOCUMENTS 3,456,995 A * 7/1969 Nyquist ................ E06B 3/5045 312/331
11,008,791 B2 * 5/2021 Rupp .................... E06B 3/5045
11,428,034 B2 * 8/2022 Rupp .................... E06B 3/5045
12,091,898 B2 * 9/2024 Goetz ..................... E06B 3/924
12,123,235 B2 * 10/2024 Rupp .................. E05D 15/0652
2020/0157867 A1 * 5/2020 Girotto ................... E05D 15/58
2022/0213725 A1 * 7/2022 Dal Castel ............. E05D 15/26
2022/0307307 A1 * 9/2022 Rupp .................... E05D 15/264
2023/0090428 A1 * 3/2023 Duer ..................... E05D 15/264 16/221

(Continued)

FOREIGN PATENT DOCUMENTS

WO WO-2019012435 A1 * 1/2019 ............. E05D 15/26

*Primary Examiner* — Daniel J Rohrhoff
(74) *Attorney, Agent, or Firm* — Rivka Friedman

(57) ABSTRACT

A furniture item is described comprising compartment, an L-shaped guide arranged on the ceiling of the furniture item, and a first and second leaf to uncover or close the compartment. Thanks to a column element hinged at one end of the second leaf and coupled with two parallel guides mounted on the side of the furniture item, the leaves can be moved.

20 Claims, 4 Drawing Sheets

(56) References Cited

U.S. PATENT DOCUMENTS

| | | | | |
|---|---|---|---|---|
| 2023/0258034 A1* | 8/2023 | Hammerer | E05D 15/58 | 49/506 |
| 2023/0320008 A1* | 10/2023 | Irgang | E05D 15/58 | 49/70 |

* cited by examiner

FURNITURE ITEM EQUIPPED WITH A COMPARTMENT THAT CAN BE CLOSED BY LEAVES

BACKGROUND

The invention relates to a furniture item having a compartment that can be closed by leaves that are slidable on the furniture item and swinging so as to be foldable-away book-like.

Many furniture items are equipped with sliding and folding leaves to reduce the size of the leaves when opened, see e.g. WO 2007 148366. Here, two leaves slide along the edges of the furniture item and can be folded over one another to pack up and be moved together along one side of the furniture item. WO 2007 148366, however, has a very complex leaf movement mechanism, which is also complicated by the lower wheels mounted on the leaves.

Improving this state of the art is the primary object of the invention, which is defined in the appended claims, wherein the dependent ones define advantageous variants.

Another object is to create a furniture item, with a compartment closable by leaves sliding and folding bellows-like one over the other, that is easy to use, requires few movements for the user and is little tiring during use.

A furniture item is proposed that—in use—comprises:

a compartment with a front opening bounded by walls and a ceiling, an L-shaped guide arranged on the ceiling of the furniture item, a first and second leaf coupled together, e.g. hinged, so that they can fold one over the other to uncover the compartment or be arranged coplanar and close the compartment, the first leaf having a free end which is slidingly coupled to the guide to obtain the book-like closing and opening of the leaves, a column element that is

- hinged at one end of the second leaf,
- coupled with two parallel guides mounted on the side of the furniture item inclined with respect to a horizontal plane, so that
  - the column element can move linearly along the side of the furniture item parallel to the depth of the compartment while remaining at the same height from the ground, and
  - the column element can move linearly between two positions, a first position adjacent to the opening of the compartment and a second position adjacent to the rear of the compartment,
- coupled to the guides and the second leaf so that
  - moving towards the—and then remaining at the—first position it extracts the packed leaves out of the side of the furniture item and brings them to unfold in front of the compartment,
  - while moving to—and then staying at—the second position it accompanies and/or pushes the coplanar leaves to fold book-like, to pack one on top of the other and to arrange themselves packed parallel to the side of the furniture item.

In other words, the column element is movable between two positions:

a first position wherein it is placed near the opening of the compartment, wherein the leaves are coplanar (closed compartment), and a second, resting position, wherein it is placed near the rear of the compartment and the leaves are packed (open compartment).

The leaves are bellows-like foldable by pivoting about at least one axis, and are slidable between a closed position of the compartment, in which they are arranged coplanar to each other in front of the compartment, and an open position of the compartment, in which they are folded one on top of the other and stored along said side of the compartment.

On said side of the compartment, then, the packed leaves can be conceal.

The leaves may be hinged to each other about a common vertical axis, or around two distinct vertical hinging axes.

In a preferred variant, the column element is slidingly mounted on parallel guides by means of skids, so that it always moves horizontally when the skids slide on the guides. The skids may comprise, for example, carriages with or without wheels, or a low-friction sliding block.

In a preferred variant, the column element has such a—or a sufficient—weight to make it slide on the guides for dragging the leaves only thanks to the force of gravity. The force of gravity, however, may act not only on the column element to make it slide on the guides but also on other elements integral with the column element.

Preferably, the column element comprises a vertical wall mounted integral and translatable together with it. More preferably, the column element comprises—or is coupled to—two vertical walls arranged orthogonally to each other and mounted integral with it. In a first variant, the two vertical walls are mutually arranged in an L shape. In a second variant, the two vertical walls are mutually arranged in a T shape. The vertical walls make it possible to cover the leaves when they are concealed, protecting them from dust and keeping their mechanisms away from accidental impacts.

An embodiment of the column element is, for example, an upright or a translating structure. In particular, the column element is preferably a straight element put vertically, e.g. a bar or a profile or a tubular element, more preferably an element having vertically a length about the same as the height of the compartment and a width (measured along the depth of the compartment) less than the depth of the compartment. E.g. the column element has a width less than ¼ or ⅕ or ⅙ of the depth of the compartment.

Preferably, the parallel guides are inclined in such a way that their lowest end is the one facing the rear of the compartment, so as to keep the column element by gravity in said second position. When the column element is in said first position, it is subject to a return force which has to be counteracted in order to keep the leaves in the closed-compartment position. The weight of the column element (and/or of all or some of its components integral thereto) is designed in such a way that the gravity force acting on it alone is sufficient to drag the column element downwards, i.e. towards the lower end of the guides. It is possible to invert the slope of the guides so as to keep the column element by gravity in the said first position.

For the purpose of holding the column member stationary, preferably the furniture item comprises an anchoring means or device between the column member and a fixed part of the furniture item, with the function of making the column member and the fixed part integral with each other for blocking the column member to said part and hold it stationary in one of its said two positions, in particular in the first position.

Preferably, the anchoring means or device comprises a stop element that is movable between a position wherein it makes the column member integral with said fixed part, and a position wherein the column member and the fixed part are disengaged. E.g. the stop element may be a pin that is movable to insert itself into—or get out of—a cavity of the fixed part. The pin may be mounted on the column member and the cavity may be obtained in the fixed portion, or vice versa.

In particular, said fixed part may be one of the parallel guides mounted inclined on the side of the furniture item.

Preferably, the furniture item comprises a device or means for synchronizing the movement of the leaves and/or the column member with that of the stop member or with the action of the anchoring means or device. In this way, the user does not have to worry about unlocking the stop element, and accidental jams in the motion of the column element are avoided.

In a variation, the device or means for synchronizing envisage a sensor for (i) detecting the position of a leaf and/or of the column element, and (ii) driving the stop element—or the anchoring means or device—as a function of the detected position.

The sensor may be electrical, electromechanical or purely mechanical. In the first two cases there may be an electronic circuit that drives the movement of the stop element as a function of a command from the user and/or the position of the column element and/or of a leaf. In a variation, the sensor consists of a mechanical detecting element, e.g. a lever, e.g. mounted protruding from the column element, which is configured for intercepting one end of a leaf moving along the L-shaped guide, being displaced due to contact with such end, and driving the stop element—or the anchoring means or device—by its own movement induced by such end.

To transfer the motion of the mechanical detecting element to the stop element, the detecting element may be connected directly to the stop element or via a kinematic chain, e.g. a series of levers or gears.

Preferably, for simplicity of construction, one or each parallel guide mounted inclined on the side of the furniture item is a profile bar.

BRIEF DESCRIPTION OF THE DRAWINGS

The advantages of the invention will be even clearer from the following description of preferred embodiments of furniture item, making reference to the attached drawing in which.

DETAILED DESCRIPTION

Figures 1, 2, 3:
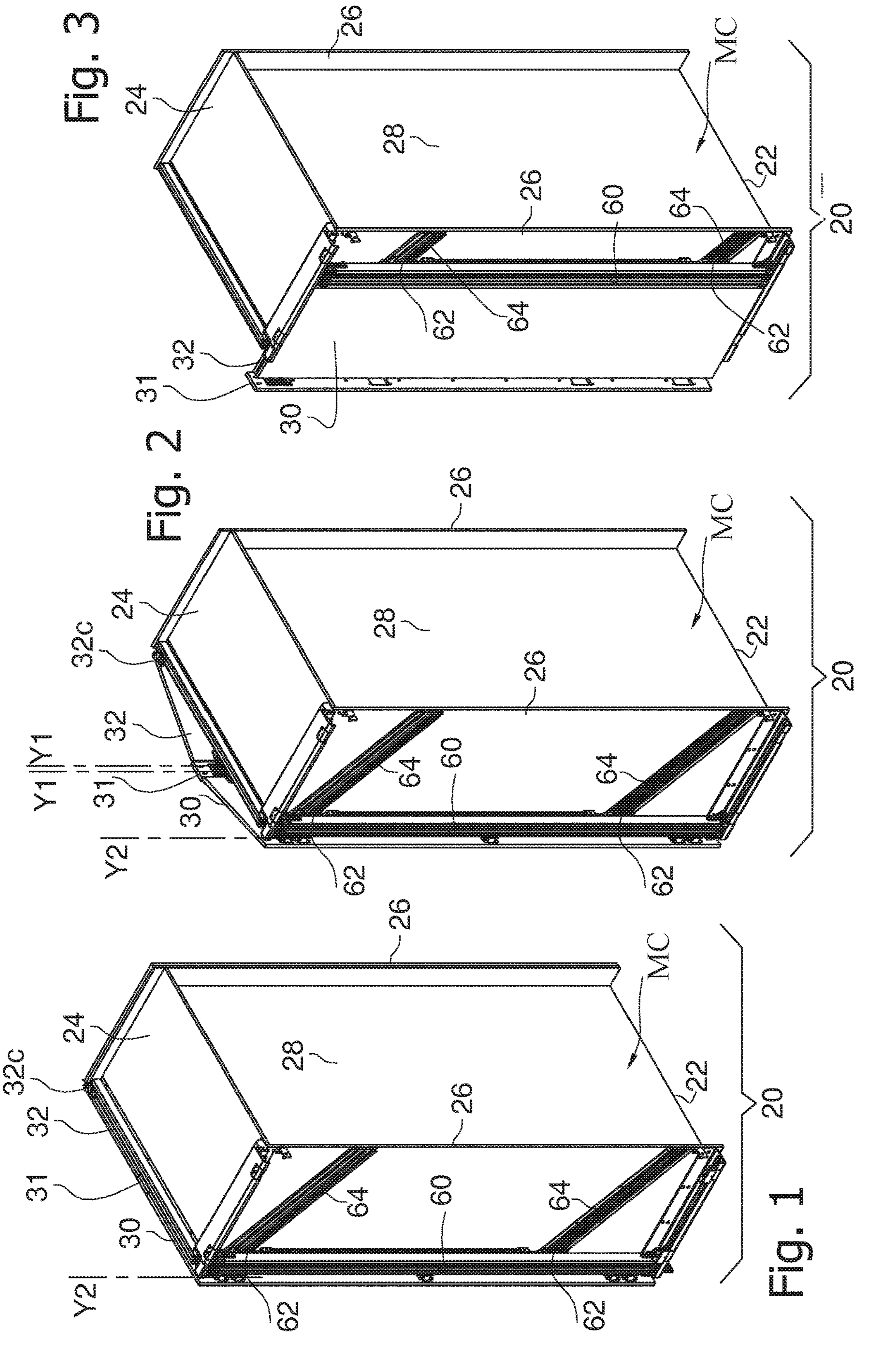
FIGS. 1-3 show three-dimensional rear views of a furniture item for a displacement sequence of the leaves.

In the figures equal numbers indicate equal or conceptually similar parts, and elements are described as in use.

A furniture item MC according to the invention comprises a module formed by a compartment that defines a space open to the outside and is bounded by: a bottom 22, a ceiling 24, two vertical side walls 26 spaced from each other by the width of the compartment 20, and a rear wall 28. The compartment 20 forms a front opening coverable by two leaves 30, 32 sliding in front of the compartment 20.

One can however form a larger piece of furniture by juxtaposing some modules or compartments 20.

The leaves 30, 32 can move in a bellows-like motion in front of the compartment 20 to close it or to leave it accessible from the outside. During the movement, the leaves 30, 32 always remain vertical and vary their relative position and that with respect to the compartment 20. When the compartment 20 is closed, the leaves 30, 32 are adjacent to each other and coplanar (FIG. 1), while to uncover the compartment 20 the leaves 30, 32 are movable to pack themselves one on top of the other at one side of the compartment 20, i.e. the leaves 30, 32 are arranged parallel to a wall 26 (FIG. 3).

In order to achieve this movement, the leaves 30, 32 are hinged to each other about a vertical axis Y1 so that they can either fold book-like over each other to uncover the compartment or be arranged coplanar and close the compartment. The vertical axis Y1 may be a hinging axis common to the two leaves 30, 32, or—as in FIGS. 1-3—between the leaves 30, 32 there may be a fitting piece 31 to which each leaf is hinged about a distinct axis Y1.

Figure 4:
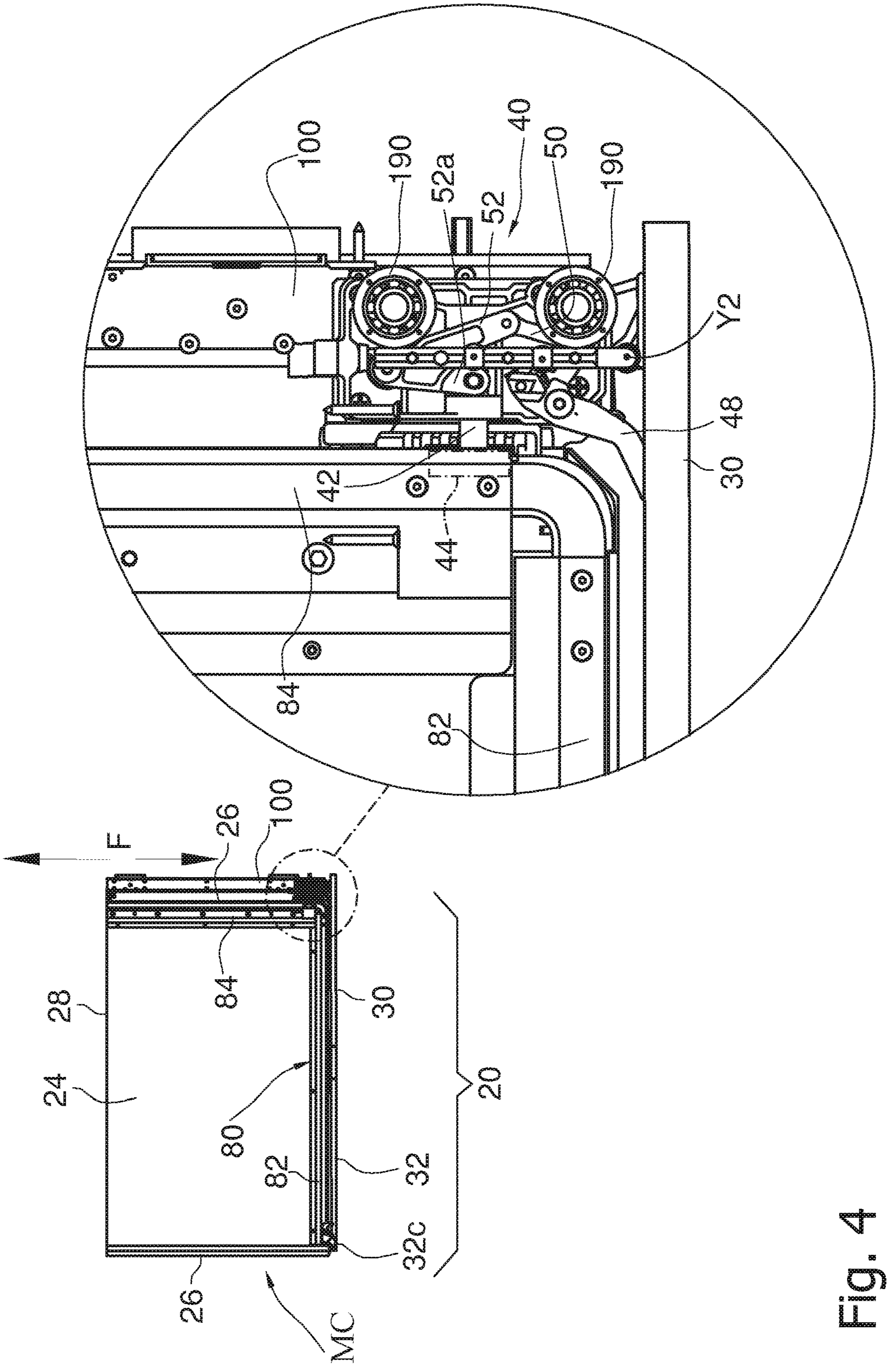
FIG. 4 shows a view from above of the furniture item.

The leaf 32 has a free end that is the farthest one from the door 30. This free end is slidingly coupled through a carriage **32*c* to an L-shaped guide 80 to obtain the book-like foldable closing and opening of the leaves, The guide 80 (see FIG. 4) is located on the ceiling 24 and comprises two coplanar segments 82, 84 connected to form an L. The segment 82 is parallel to the wall 28 while the segment 84 is orthogonal to the wall 28. Thus, the guide 80 is able to carry the end of the leaf 32 first from one end of the compartment 20 to the other, and then all the way to the vicinity of the wall 28 when the leaves 30, 32 are packed on top of each other (FIG. 3). The leaf 30 has one end (the one, with the leaves coplanar, that is opposite to and furthest from the leaf 32) that is hinged about a vertical axis Y2 to a column element 60, which is linearly translatable along a direction parallel to the wall 26 (or in other words orthogonal to the wall 28**), see arrow F.

In the example the column element 60 is a straight profile bar.

The column element 60 is mounted slidable—via skids or carriages 62—on linear guides 64 mounted on the side of the compartment 20. The two guides 64 are parallel, spaced apart from each other and inclined with respect to the horizontal. The two guides 64 are, for example, straight bars or profiled bars. The skids or carriages 62 are also movably mounted in the column element 60 to slide in the direction of its length.

Thanks to the inclined guides 64, the column element 60 can be drawn by gravity towards the wall 28. Since the skids 62 also run vertically on the column element 60, it can only translate horizontally, i.e. the element 60 can move linearly along the furniture item's side parallel to the depth of the compartment 20 on the guides 64 while always remaining at the same height from the floor and/or always vertical.

The stroke of the column element 60 is such that it can move linearly (see arrow F) between two positions: a first position adjacent to the opening of the compartment 20 (FIG. 1) and a second position adjacent to the back of the compartment 20 (where there is the wall 28, see FIG. 3). When the column element 60 moves towards the first position, it pulls the packed leaves 30, 32 out of the furniture item's side and brings them to unfold in front of the compartment 20. When the column element 60 moves from the first position towards the second position, it pushes or accompanies the coplanar leaves 30, 32 so that they fold like a book, pack on top of each other and arrange themselves packed parallel to the furniture item MC's side.

Figure 7:
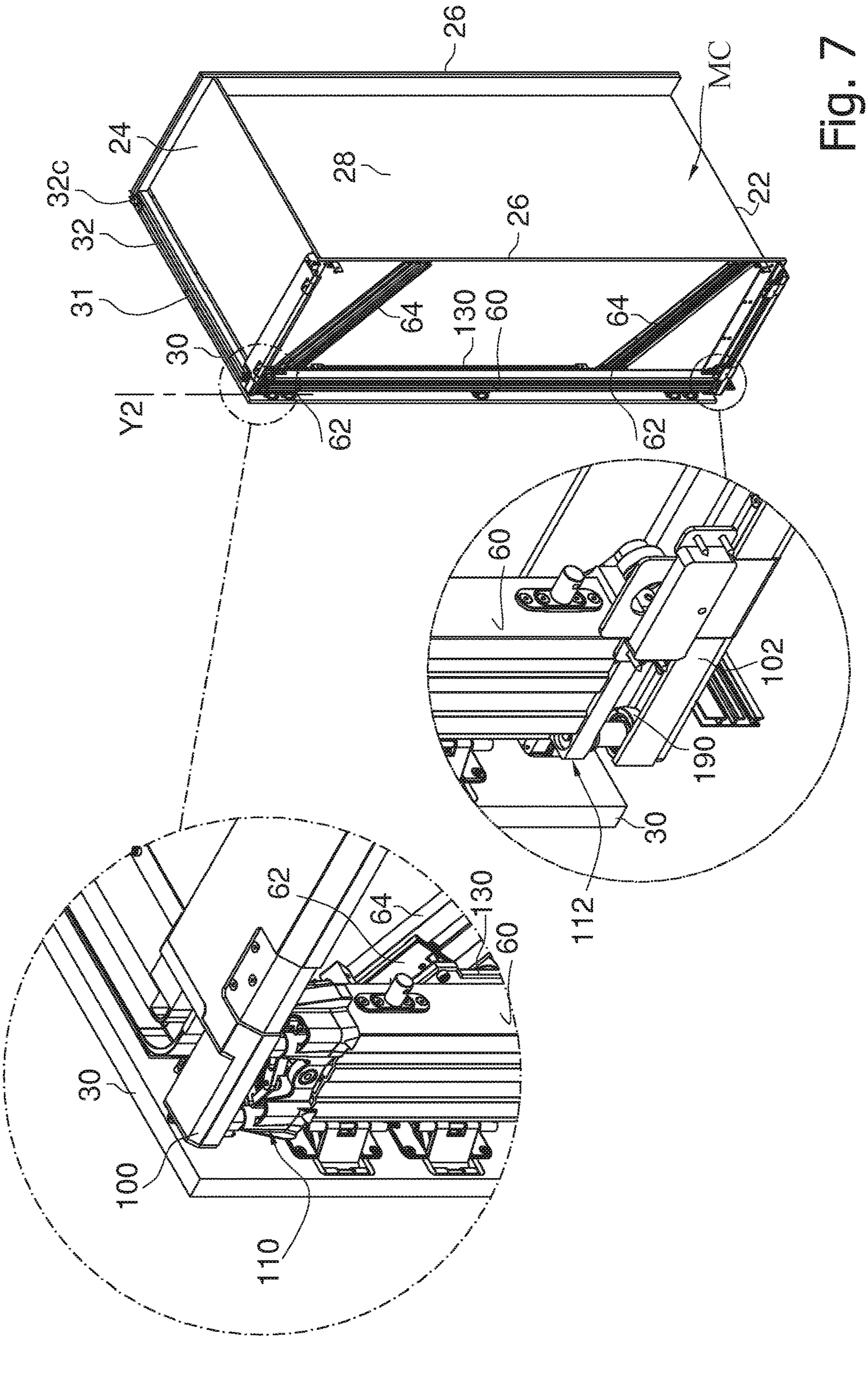
FIG. 7 shows optional details of the furniture item.

Preferably, to better guide the column element 60, an upper horizontal linear guide 100 and a lower horizontal linear guide 102 are mounted on a side or edge of the furniture item MC, see FIG. 7. The guides 100, 102 are parallel to each other.

The column element 60 comprises at its opposite ends two respective carriages 110, 112 slidable on the guides 100, 102 by means of rollers 190. The rollers 190 have a vertical rotation axis, to stabilize the linear displacement of the column element 60 on the guides 100, 102.

The own weight of the column element 60 is discharged onto the bottom guide 102 via the corresponding bottom carriage 112. For this purpose, it is preferable that at least one roller with a horizontal rotation axis or a magnetic levitation skid is mounted on the carriage 112, for rolling or sliding on the guide 102.

To initiate the movement of the leaves 30, 32 the user only needs to pull the element 60 or the fitting piece 31, which are preferably equipped with a handle for this purpose.

As can be seen from the figures, the inclined guides 64 tend to bring by gravity the column element 60 towards the rear wall 28 of the compartment 20, so as to force it into said second position, corresponding to the opened compartment 20 and the packed leaves 30, 32.

When column element 60 stays in the first position, it is subject to the same return force.

In particular, the movement of the column member 60 from the extracted position towards the position inserted in the side seat of the furniture item MC may be due to the own weight of the carriages 62 sliding along the inclined guides 64. Preferably, the carriages 62 are rigidly connected by a connecting element or bar 130 extending parallel to the column element 60. The connecting element or bar 130 gives added rigidity to the translating system, and its weight contributes to the aforementioned return force.

Preferably, a or each carriage 62 is equipped with casters, to better slide on the guide 64, and/or with a brake or shock absorber, to better level the sliding stresses on the guide 64. For example, said brake is a magnetic action brake.

To keep the compartment 20 stably closed by the leaves 30, 32 the furniture item MC comprises an anchoring device between the column member 60 and a fixed part of the furniture item (e.g. a wall 26 and/or a guide 64), so the column member 60 can be locked to the compartment 20 to hold the former in the first position.

The anchoring device is preferably mounted in the column member 60, for simplicity of construction, and comprises a stop member (e.g. a pin) that is movable to be inserted in, or get out of, a cavity 44 of the top guide 64.

In a variant, the stop element may be, for example, snap-acting, i.e. it may be pushed into the cavity 44 by a spring or by its elastic deformation. In this case, the user would have to manually unlock the stop element in order to move the column element 60. To avoid this inconvenience, preferably the furniture item MC comprises a device or means for synchronizing the movement of the leaves 30, 32 and/or the column element 60 with that of the stop element. Among other things, accidental jams in the movement of the column element 60 are thus prevented. In a different variant, the stop element may be, for example, driven by an electric actuator.

Figure 6:
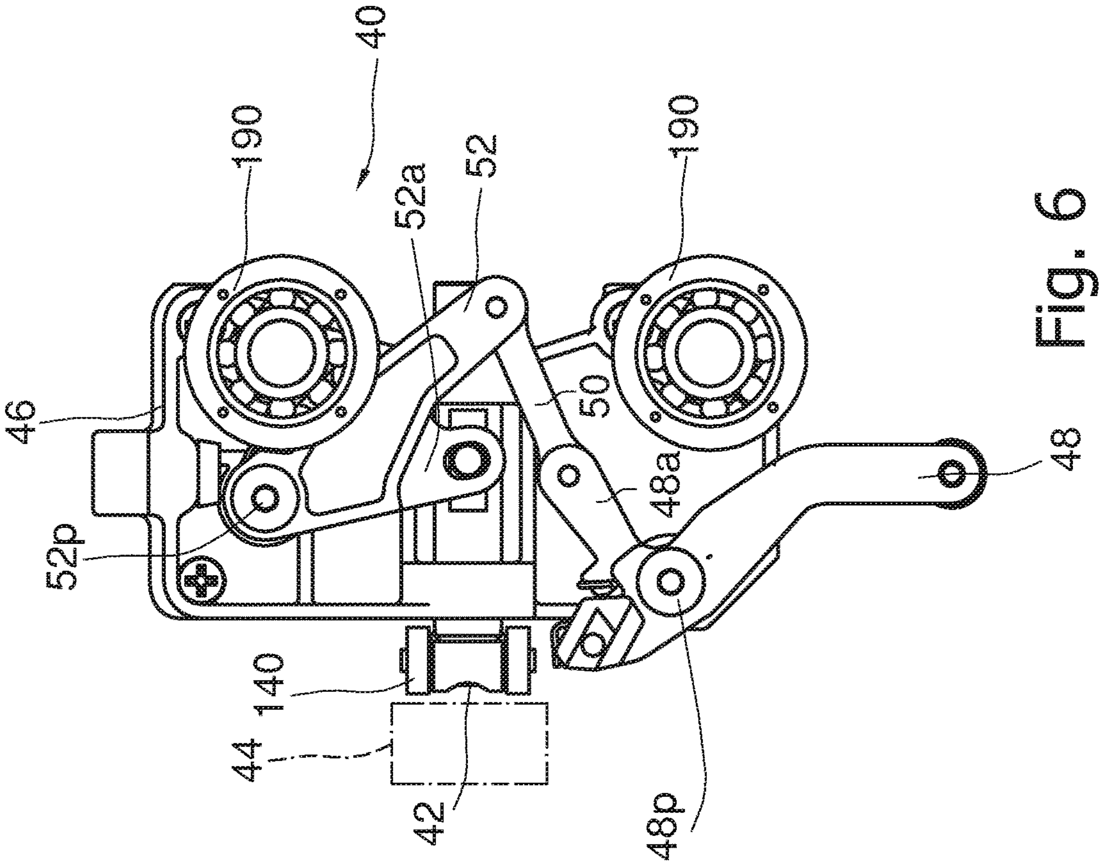
FIGS. 5-6 show a component of the furniture item in two different operating configurations.
Figure 5:
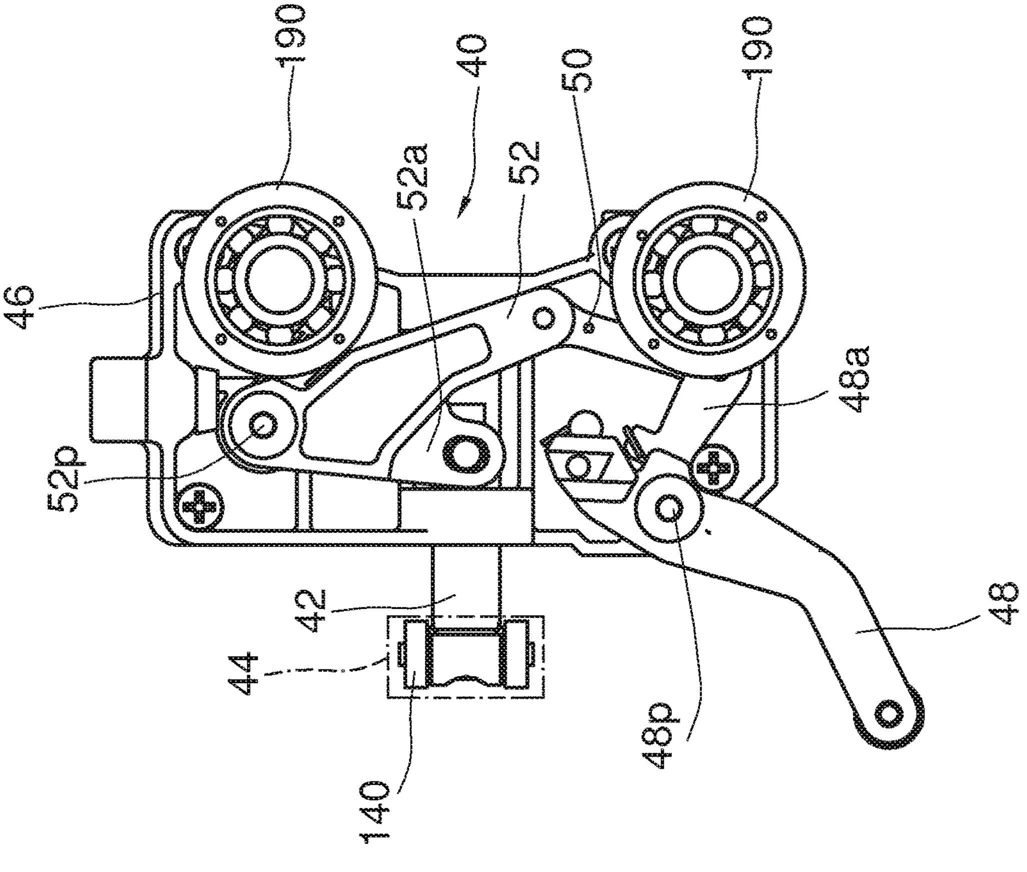

A preferred anchoring device 40—shown in detail in FIGS. 5 and 6—comprises a stop element 42 (e.g. a pin) that is movable to be inserted into, or get out of, a cavity 44 of said fixed part. The stop element 42 is movable with respect to a block 46 mounted on the column element 60. Pivoted on the block 46 by means of a fulcrum **48*p* is a lever 48 that protrudes from the perimeter of the block 46 to be rotatable by the free end of the leaf 32 when said free end arrives near the column member 60** stationary in the first position.

The lever 48 comprises an arm **48*a* hinged—via a connecting rod 50—with a second lever 52 pivoted via a fulcrum 52*p* in the block 46. The lever 52 comprises an arm 52*a* hinged with the stop member 42**.

When the leaves 30,32 are coplanar, nothing presses on the lever 48 and the stop element 42 protrudes from the block 46 to enter the cavity 44. Thus the column element 60 is held in place and does not slide on the guides 64.

When the leaves 30,32 overlap, the free end of the leaf 32, guided by the guide 80, comes close to the free end of the lever 48, and presses it making it rotate. This sets in motion the linkage of the device 40: the arm **48*a* pushes the lever 50 which pushes the lever 52 making it rotate about the pin 52*p*. Then the arm 52*a* pulls the stop member 42, which retracts into the block 46 and exits the cavity 44 releasing the column member 60 from the compartment 20 and allowing the column member 60 to move on the guides 64**.

In the illustrated example, the stop element 42 is linearly movable, but different trajectories are also possible, e.g. it may also or only rotate about an axis.

In a different embodiment, the stop member 42 is engageable in a recess provided in one of the carriages 62, thereby preventing the carriage 62 from sliding along the inclined guide 64. That is, the cavity 44 is made in one or each of the carriages 62.

Preferably, the stop element 42 carries at its free end at least one sliding roller 140 for engaging the seat 44 without snagging.

Due to the fact that all locking/unlocking elements are mounted on board the column element 60, there is the advantage that all adjustment parts subject to wear or damage are easily accessible for replacement or repair. In addition, since there are no parts on the furniture item MC, variability due to the sum of positioning tolerances is minimized, making the system much more stable and insensitive to geometric variations in both the components and the assembly process.

The invention claimed is:

1. Furniture item comprising:
- a compartment with a front opening bounded by walls and a ceiling,
- an L-shaped guide arranged on the ceiling of the furniture item,
- a first and second leaf coupled together in such a way as to be able to fold one on top of the other to uncover the compartment or to be able to be arranged as coplanar leaves and close the compartment, the first leaf having a free end which is slidingly coupled to the guide to obtain an effect of closing and opening of the leaves like a folding-sliding system,
- a column element that is
  - hinged at one end of the second leaf,
  - coupled with two parallel guides mounted on the side of the furniture item inclined with respect to a horizontal plane, so that the column element can
    - move linearly along the side of the furniture item parallel to the depth of the compartment while remaining at the same height from the ground, and
    - move linearly between two positions, a first position adjacent to the opening of the compartment and a second position adjacent to the rear of the compartment, coupled with the inclined guides and the second leaf so that while moving to the second position, and then staying at the second position, the column element accompanies and/or pushes the coplanar leaves to fold like the folding-sliding system, to pack themselves one on top of the other and to arrange themselves as packed leaves packed parallel to the side of the furniture item, and while moving towards the first position, and then remaining at the first position, the column element extracts the packed leaves out of the side of the furniture item and brings them to unfold in front of the compartment.

2. Item according to claim 1, wherein the column element is a bar set vertically having a length approximately as the height of the compartment and a width, measured along the depth of the compartment, less than the depth of the compartment.

3. Item according to claim 1, wherein the column element has a weight such as to—or sufficient to—make the column element slide on the inclined guides to drag the leaves only by gravity force.

4. Item according to claim 1, wherein the column element is coupled to the two inclined guides by means of respective carriages, which have a weight such as to—or sufficient to—make the column element slide on the inclined guides to drag the leaves only by gravity force.

5. Item according to claim 4, wherein the carriages for making the column element slide on the inclined guides are connected to each other by a rigid element, whose weight is such as to, or sufficient to, or contributes to, make the column element slide on the inclined guides.

6. Item according to claim 4, wherein said part of the furniture item is a seat formed in each of said respective carriages with which the column member is coupled to one of said two inclined guides (64).

7. Item according to claim 5, wherein the device or means for synchronizing comprises a sensor for (i) detecting the position of a leaf and/or the column element, and (ii) driving the anchoring means or device as a function of the position so detected.

8. Item according to claim 1, comprising:

two auxiliary slides mounted parallel and spaced apart on one side of the furniture item, and the column element is slidingly coupled to the two auxiliary slides by means of respective auxiliary carriages for sliding linearly horizontally along the furniture item's side.

9. Item according to claim 1, wherein the inclined parallel guides are inclined such that their lowest end is the end facing the rear of the compartment, so as to maintain by gravity the column element at said second position.

10. Furniture according to claim 1, comprising an anchoring means or device for anchoring the column member and a part of the furniture item, so as to make the column member and said part integral with each other to block the column member to said part and hold it still in the first position.

11. Item according to claim 10, wherein said part of the item is a fixed part of the furniture item (MC).

12. Item according to claim 10, wherein said part of the furniture item is a seat formed in a carriage with which the column member is coupled to one of said two inclined guides (64).

13. Item according to claim 10, wherein said part is one of said guides.

14. Item according to claim 10, wherein the anchoring means or device is mounted on the column element.

15. Item according to claim 10, wherein the anchoring means or device comprises a stop element movable between a position wherein it makes the column element integral with said part, and a position wherein the column element and the part are disengaged.

16. Item according to claim 15, wherein the stop element is linearly movable.

17. Item according to claim 15, wherein the stop element has a free end movable for selective engagement with said part, the free end being provided with a rolling element.

18. Item according to claim 10, comprising a device or means for synchronizing the movement of the leaves and/or the column element with the action of the anchoring means or device.

19. Item according to claim 10, wherein the device or means for synchronizing comprises a sensor for (i) detecting the position of a leaf and/or the column element, and (ii) driving the anchoring means or device as a function of the position so detected.

20. Item according to claim 19, wherein the sensor consists of a lever that is mounted protruding from the column element and is configured to intercept one end of a leaf moving along the L-shaped guide, be displaced due to contact with such end, and drive the anchoring means or device by its movement induced by such end.

* * * * *